(12) United States Patent
Hunton

(10) Patent No.: US 7,170,952 B2
(45) Date of Patent: Jan. 30, 2007

(54) SYSTEM AND METHOD FOR POST FILTERING PEAK POWER REDUCTION IN COMMUNICATIONS SYSTEMS

(75) Inventor: Matthew J. Hunton, Liberty Lake, WA (US)

(73) Assignee: Powerwave Technologies, Inc., Santa Ana, CA (US)

( * ) Notice: Subject to any disclaimer, the term of this patent is extended or adjusted under 35 U.S.C. 154(b) by 853 days.

(21) Appl. No.: 10/102,493

(22) Filed: Mar. 20, 2002

(65) Prior Publication Data

US 2003/0012292 A1      Jan. 16, 2003

Related U.S. Application Data

(60) Provisional application No. 60/302,565, filed on Jul. 2, 2001.

(51) Int. Cl.
*H04L 27/04* (2006.01)
*H04L 25/03* (2006.01)
*H04B 1/69* (2006.01)

(52) U.S. Cl. .................................. 375/296; 375/146

(58) Field of Classification Search ................ 375/222, 375/260, 130, 144, 295, 296, 146, 140; 332/117, 332/123; 370/335, 342, 441
See application file for complete search history.

(56) References Cited

U.S. PATENT DOCUMENTS

| | | | |
|---|---|---|---|
| 3,898,566 A | 8/1975 | Switzer et al. | |
| 4,878,232 A | 10/1989 | Fisher | |
| 5,163,181 A | 11/1992 | Koontz | |
| 5,228,055 A | 7/1993 | Uchida et al. | |
| 5,249,201 A | 9/1993 | Posner et al. | |
| 5,490,172 A | 2/1996 | Komara | |

(Continued)

FOREIGN PATENT DOCUMENTS

EP      000940925 A1 *      9/1999

(Continued)

OTHER PUBLICATIONS

Wireless Systems Design, Sep. 200, "Baseband Clipping Can Lead to Improved WCDMA Signal Quality", Paul Stadnik, pp. 40-44.

(Continued)

*Primary Examiner*—Tesfaldet Bocure
(74) *Attorney, Agent, or Firm*—David L. Henty; Myers Dawes Andras & Sherman LLP

(57)      ABSTRACT

A system and method for post filtering signal peak reduction adapted for use in a communication system incorporating a source of a communication signal band limited in a manner corresponding to a spectral band to which the communication system is limited. A first signal path receives as an input the band limited communication signal. A second parallel signal path includes a peak reduction calculation unit for calculating a peak reduction correction signal and a filter providing a filtering operation on the peak reduction correction signal corresponding to the spectral band to which the communication system is limited. The filtered peak reduction correction signal and delayed input signal are combined to provide peak adjusted output signals without violating the band limits of the communication signal or the modulation scheme of the communication signal.

23 Claims, 10 Drawing Sheets

U.S. PATENT DOCUMENTS

| | | | |
|---|---|---|---|
| 5,493,587 A | 2/1996 | Sandri et al. | |
| 5,579,342 A | 11/1996 | Crozier | |
| 5,608,760 A | 3/1997 | Sandri et al. | |
| 5,621,762 A | 4/1997 | Miller et al. | |
| 5,636,247 A | 6/1997 | Kamerman et al. | |
| 5,638,404 A | 6/1997 | Crozier | |
| 5,651,028 A | 7/1997 | Harris et al. | |
| 5,694,431 A * | 12/1997 | McCoy | 375/295 |
| 5,727,026 A | 3/1998 | Beukema | |
| 5,751,705 A * | 5/1998 | Sato | 370/335 |
| 5,805,640 A | 9/1998 | O'Dea et al. | |
| 5,822,360 A | 10/1998 | Lee et al. | |
| 5,930,678 A | 7/1999 | Alley et al. | |
| 5,991,262 A | 11/1999 | Laird et al. | |
| 6,009,090 A * | 12/1999 | Oishi et al. | 370/342 |
| 6,032,029 A | 2/2000 | Futagi et al. | |
| 6,041,081 A | 3/2000 | O et al. | |
| 6,125,103 A | 9/2000 | Bauml et al. | |
| 6,128,351 A | 10/2000 | Jones et al. | |
| 6,130,918 A | 10/2000 | Humphrey et al. | |
| 6,175,551 B1 | 1/2001 | Awater et al. | |
| 6,222,873 B1 | 4/2001 | Bang et al. | |
| 6,229,995 B1 | 5/2001 | Lee | |
| 6,236,864 B1 | 5/2001 | McGowan et al. | |
| 6,240,141 B1 | 5/2001 | Long | |
| 6,246,725 B1 | 6/2001 | Vanzieleghem et al. | |
| 6,294,956 B1 | 9/2001 | Ghanadan | |
| 6,356,606 B1 | 3/2002 | Hahm | |
| 6,449,302 B2 * | 9/2002 | Hunton | 375/130 |
| 6,504,862 B1 | 1/2003 | Yang | |
| 6,529,560 B1 * | 3/2003 | Creighton | 375/284 |
| 6,687,511 B2 * | 2/2004 | McGowan et al. | 455/522 |
| 6,701,163 B1 | 3/2004 | Hiramatsu | 455/561 |
| 6,931,053 B2 * | 8/2005 | McGowan | 375/146 |
| 6,931,079 B1 * | 8/2005 | Peeters | 375/296 |
| 6,931,239 B2 * | 8/2005 | Hongo et al. | 455/103 |
| 2002/0012403 A1 * | 1/2002 | McGowan et al. | 375/295 |
| 2003/0067995 A1 | 4/2003 | Matsuoka et al. | |

FOREIGN PATENT DOCUMENTS

| | | |
|---|---|---|
| EP | 1 091 516 A | 4/2000 |
| WO | PCT/US97/00810 | 1/1997 |

OTHER PUBLICATIONS

EPO Search Report.

Translation of Office Action Issued by Chinese Patent Office.

* cited by examiner

SYSTEM AND METHOD FOR POST FILTERING PEAK POWER REDUCTION IN COMMUNICATIONS SYSTEMS

RELATED APPLICATION INFORMATION

The present application claims priority under 35 USC §119 (e) of provisional application Ser. No. 60/302,565 filed Jul. 2, 2001, the disclosure of which is incorporated herein by reference in its entirety.

BACKGROUND OF THE INVENTION

1. Field of the Invention

The present invention relates to communications systems that transmit signals that may be composed of one or more combined transmit carriers. Each of these carriers may include one or more communication channels. More particularly, the present invention relates to wireless communications systems and signal processing apparatus employed in wireless communications systems. The term 'wireless communications systems' includes cellular communication systems, personal communication systems (PCS), wireless local loop systems, and all other like systems.

2. Background of the Prior Art and Related Information

Wireless communications systems employing transmission between base stations and remote users are a key component of the modern communications infrastructure. These wireless systems are being placed under increasing performance demands that are taxing the capability of available equipment, especially wireless base station equipment. These increasing performance demands are due to both the increasing numbers of users within a given wireless region, as well as the bandwidth requirements allocated to wireless system service providers. The increasing number of wireless users is of course readily apparent and this trend is unlikely to slow due to the convenience of wireless services. The second consideration is largely due to the increased types of functionality provided by wireless systems, such as wireless Internet access and other forms of wireless data transfer over such systems. These considerations have resulted in a need for more communication channels per carrier and more carriers operating from each transmitting location of a wireless service network.

One method of transmitting multiple communication channels on a single carrier is to use a code multiplexed signal generator as shown in FIG. 1. Data channels from different users enter the code multiplexed signal generator 1 to produce a complex signal output represented by in-phase and quadrature-phase components $V_1$ and $V_2$ respectively. This complex signal output is then band limited by filtering 2, converted to a baseband analog signal by Digital-to-Analog (D/A) conversion 3, modulated to an RF frequency 4, amplified 5 and transmitted by an antenna 6. This method is used by wireless systems providing CDMA (Code Division Multiple Access) or WCDMA (Wideband Code Division Multiple Access) services.

Other methods exist for combining several communication channels onto a single carrier. For example the code multiplexed signal generator 1 in FIG. 1 could be replaced with a time multiplexed signal generator. As before multiple input data signals would be combined to produce a complex signal output represented by in-phase and quadrature-phase components $V_1$ and $V_2$ respectively. NADC (North American Digital Cellular) and GSM (Global System for Mobile Communications) wireless service providers use time multiplexed signal generators.

For single carrier generation, the signal generator 1 of FIG. 1 and the filter 2 create signal peaks which determine the peak-to-average ratio of the signal which must be D/A converted 3, modulated 4, and amplified 5. High peak-to-average ratios require increased cost in these components. D/A converters with large bit counts must be used to both create the large peaks and maintain adequate signal resolution to overcome noise generated in the D/A conversion process. High peak-to-average ratios require the use of very linear RF up converting modulator and power amplifier components to prevent signal distortion from increasing carrier bandwidth through distortion and intermodulation. Signal bandwidth is government regulated. Increased carrier bandwidth may cause operation outside government allocated operating bands in violation of the law.

FIG. 2 shows a prior art multiple carrier communication system. FIG. 2 shows signal generation of M complex signals $V_{m,1}$ and $V_{m,2}$. Each complex signal would then be filtered 2, offset in frequency 7, and combined 8 to generate a single complex signal. This combined complex signal would then be processed in a manner identical to the single carrier signal after filtering 2 in FIG. 1.

When generating a multiple carrier signal as shown in FIG. 2, the output signal peak-to-average ratio is determined by the signal generators 1, the filters 2, and the interaction of each carrier in combining 8. This multiple carrier signal must then be D/A converted 3, modulated 4, and amplified 5. As with the single carrier, high peak-to-average ratios increase the cost of the D/A converter 3, RF up converting modulator 4, and amplifier 5 components.

In a previous approach, placing a signal-peak suppression block prior to filtering 2 has been employed in an attempt to reduce the peak-to-average ratio in single carrier communication systems. This prior art approach is shown in FIG. 3. The signal-peak suppression block 9 operates by adjusting the input complex signal prior to filtering. By making signal adjustments prior to filtering, the resultant adjustments do not affect signal bandwidth guaranteeing operation within government allocated limits. The subsequent filtering introduces new peaks, however, and the effectiveness of the prior signal-peak suppression block is greatly reduced.

As mentioned previously, the peak power of a multiple carrier communication system, as shown in FIG. 2, is dependent on the signal generators 1, filters 2, and interaction of each carrier in combining 8. The approach shown in FIG. 3 if inserted prior to filtering 2 in FIG. 2 would be incapable of correcting for the interaction of each carrier in combining. This limitation would eliminate most, if not all, benefits of such an application of prior art.

In single carrier communication systems it is often difficult to place a peak reduction block before filtering 2 and obtain effective peak reduction. Applying previous art in a multiple carrier communication system would prove ineffective. Therefore, a problem exists in prior approaches to reducing high signal peaks in communications systems.

SUMMARY

In a first aspect the present invention provides a communication system comprising a communication signal source providing a band limited communication signal; for example, the communication system may be a multi-carrier communication system or a spread spectrum communication system. A peak reduction unit is coupled to receive the band limited communication signal and provide a band limited peak reduced output signal. The peak reduction unit comprises a circuit for providing a peak reduction correction waveform corresponding to the difference between the communication signal and the communication signal hard limited to a limit value and a correction filter for filtering the peak reduction correction waveform and providing a band limited peak reduction correction signal corresponding to the band limits of the communication signal. A combiner receives the band limited communication signal and the band limited peak reduction correction signal and combines them to provide a band limited peak reduced output signal. The peak reduction unit also preferably comprises a delay for delaying the band limited communication signal and providing the delayed signal to the combiner. The communication system may further comprise a digital-to-analog conversion stage for converting the peak reduced output signal to an analog signal, a power amplifier receiving and amplifying the analog signal, and an antenna coupled to the output of the power amplifier.

In a further aspect, the present invention provides a peak reduction unit adapted for use in a communication system. The peak reduction unit comprises a first signal path and a second parallel signal path. The first signal path receives a band limited input signal and includes a delay circuit for delaying the input signal. The second parallel signal path also receives the band limited input signal and includes a peak reduction calculation unit for calculating a peak reduction correction and a filter providing a filtering operation on the peak reduction correction. The peak reduction unit further comprises a combiner combining the filtered peak reduction correction and delayed input signal and providing peak adjusted output signals.

In a preferred embodiment of the peak reduction unit, the second signal path further comprises a signal magnitude detector, a comparator for comparing the signal magnitude to a predetermined limit value and a switch coupled to the output of the comparator and the peak reduction calculation unit for selecting the peak reduction correction if the signal magnitude exceeds the predetermined limit value. The second signal path may also include a gain circuit for adjusting the magnitude of the correction by a gain value. The gain circuit may comprise a multiplier receiving the peak reduction correction signal and multiplying it by the gain value. The gain value should be less than 1 when the peak impulse response of the correction filter is normalized to 1. In a more general case the gain value should be greater than zero but less than a level that would cause the peak to average ratio to begin increasing. The input signal may comprise digital samples represented by complex vectors and the peak reduction calculation unit may comprise an algorithm processor which performs a complex vector calculation on the input samples to determine a complex correction vector which when added to the input sample results in a signal magnitude at or within a predetermined limit value. The combiner preferably comprises an addition circuit. The filter provides a filtering operation limiting the correction signal to a frequency band corresponding to the spectral band of the band limited input signal and may comprise a finite impulse response filter.

In a further aspect, the present invention provides a method for signal peak reduction in a communication system where the communication signal is processed to limit the signal bandwidth to a predetermined spectral band. The method comprises receiving as an input a band limited communication signal and determining a peak reduction correction signal based on the amount the band limited communication signal exceeds a threshold peak power value. The method further comprises filtering the peak correction signal to limit the bandwidth of the peak correction signal and combining the filtered peak correction signal and input filtered communication signal to provide a peak reduced output communication signal. Preferably the input communication signal is delayed prior to combining with the filtered peak correction signal.

Preferably the method for signal peak reduction further comprises adjusting the peak correction signal by a gain value before the combining. Also, the determining, gain adjusting, filtering and combining may be repeated employing a different gain value. The determining preferably comprises performing a peak reduction algorithm on the input communication signal. The method for signal peak reduction may further comprise detecting the magnitude of the input communication signal and comparing the magnitude to a peak limit value and selectively outputting the peak reduction correction signal to be filtered and combined only when the magnitude of the input communication signal exceeds the magnitude of the peak limit value. Preferably the filtering operation limits the peak reduction correction signal to a frequency band corresponding to the spectral band of the communication signal.

The method for signal peak reduction may be employed in a multi-carrier communication system wherein the communication signal is a multi-carrier signal provided by combining a plurality of separate carrier signal sources, each having a stream of carrier symbols corresponding to one or more data channels. Alternatively, the method for signal peak reduction may be employed in a spread spectrum communication system wherein the communication signal is a spread spectrum signal provided by combining a plurality of separate streams of communication symbols corresponding to a plurality of data channels.

Accordingly, it will be appreciated that the present invention provides a system and method for signal peak reduction, adapted for use in a communication system incorporating a source of a band limited communication signal, which provides signal peak reduction of the communication signal without violating the band limits of the communication signal or the modulation scheme of the communication signal. Further features and aspects of the present invention will be appreciated by reviewing the following detailed description of the invention.

DETAILED DESCRIPTION OF THE INVENTION

Figure 1:
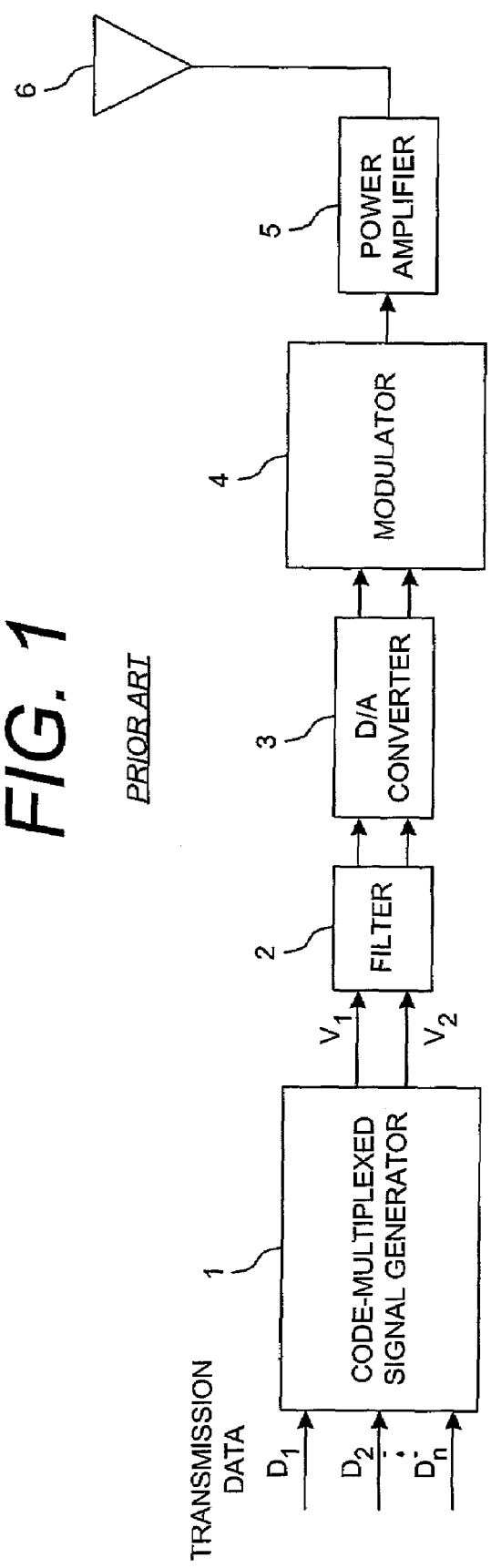
FIG. 1 is a block schematic drawing of a prior art single carrier communications system.
Figure 2:
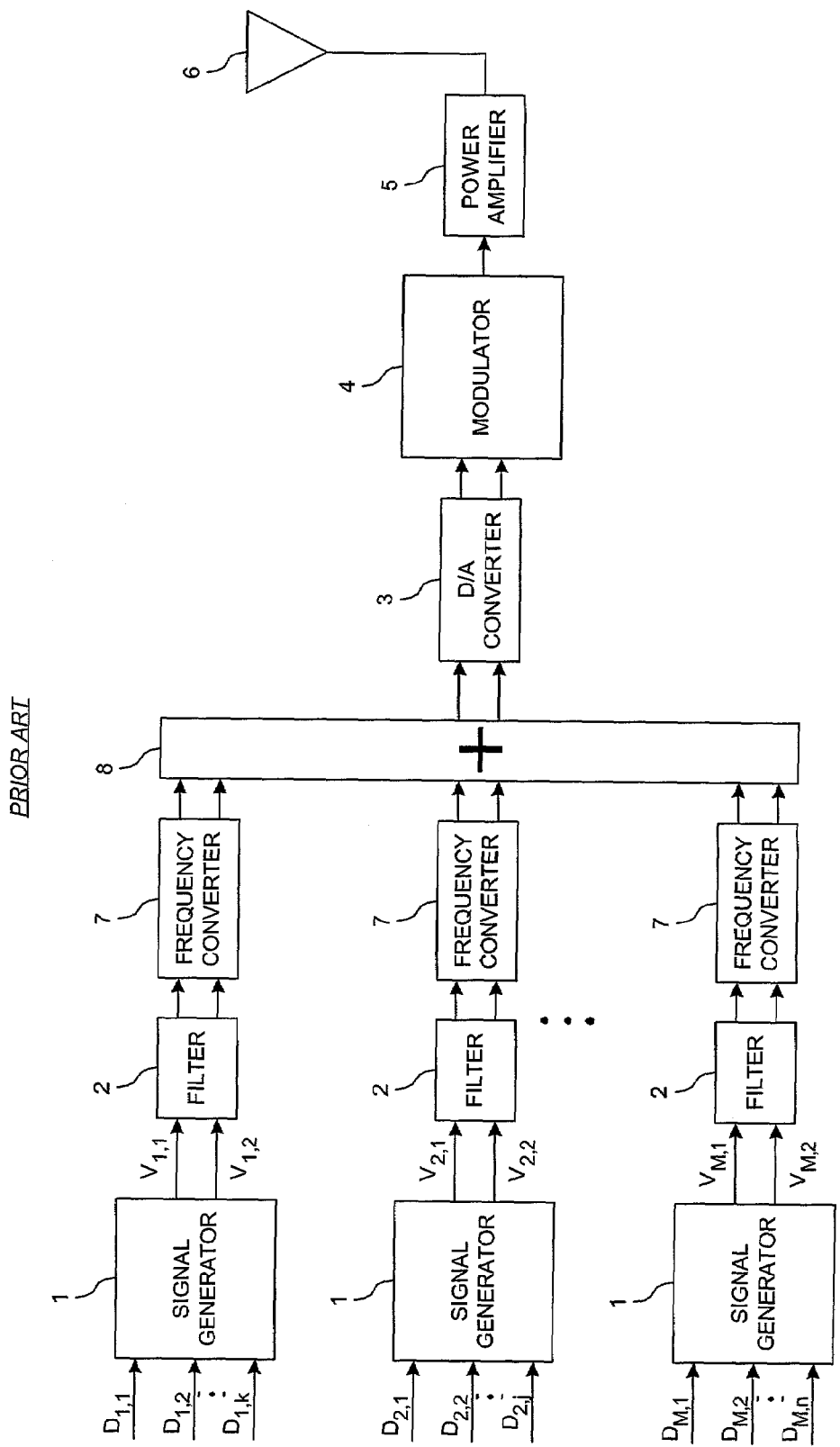
FIG. 2 is a block schematic drawing of a prior art multiple carrier communications system.
Figure 3:
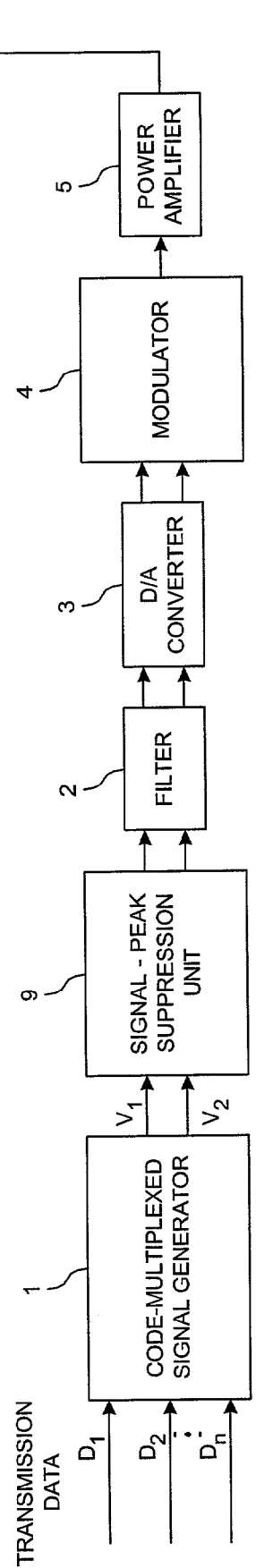
FIG. 3 is a block schematic drawing of a prior art single carrier communications system with peak reduction performed prior to filtering.
Figure 4:
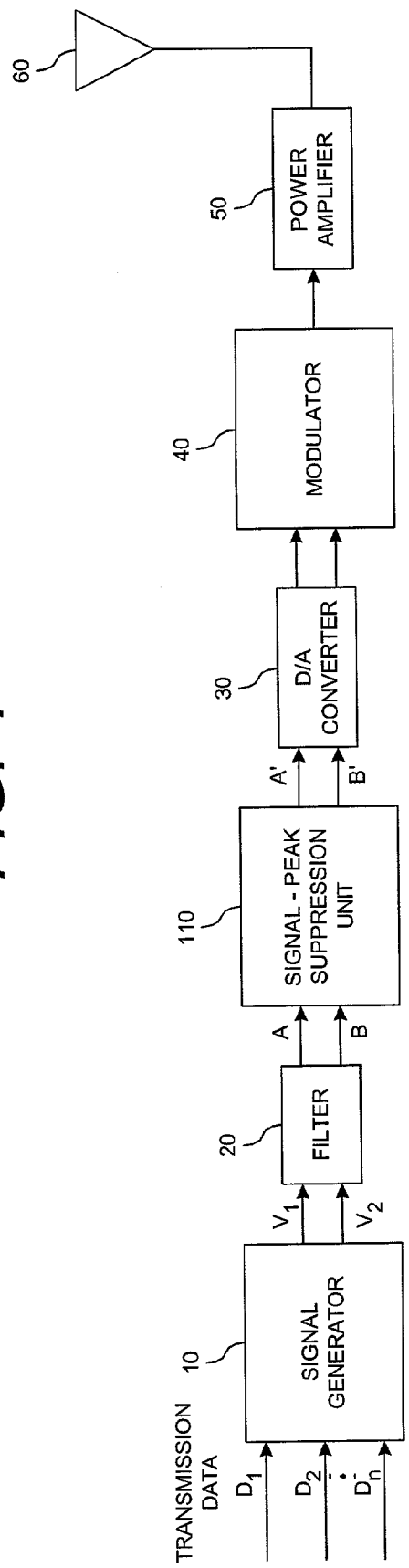
FIG. 4 is a block schematic drawing of the present invention showing signal-peak suppression just prior to D/A conversion in a single carrier communication system.

A preferred embodiment of a single carrier communications system employing signal-peak suppression (or reduction) in accordance with the present invention is illustrated in FIG. 4. A preferred embodiment of a multiple carrier communications system employing signal-peak suppression in accordance with the present invention is illustrated in FIG. 5.

Referring to FIG. 4, a communication signal, which may comprise a digitally sampled signal stream represented by an in-phase component signal stream A and a quadrature-phase component signal stream B, is input to a signal-peak suppression unit 110. This digitally sampled signal stream may contain one or more communications channels as produced by the signal generator 10 and filter 20. The signal-peak suppression unit outputs a peak-reduced signal stream represented by an in-phase component signal stream A' and a quadrature component signal stream B'. This signal-peak suppression output signal is then D/A converted at D/A converter 30, modulated onto a RF carrier at RF up converting modulator 40, amplified by power amplifier 50, and transmitted with an antenna 60.

Figure 5:
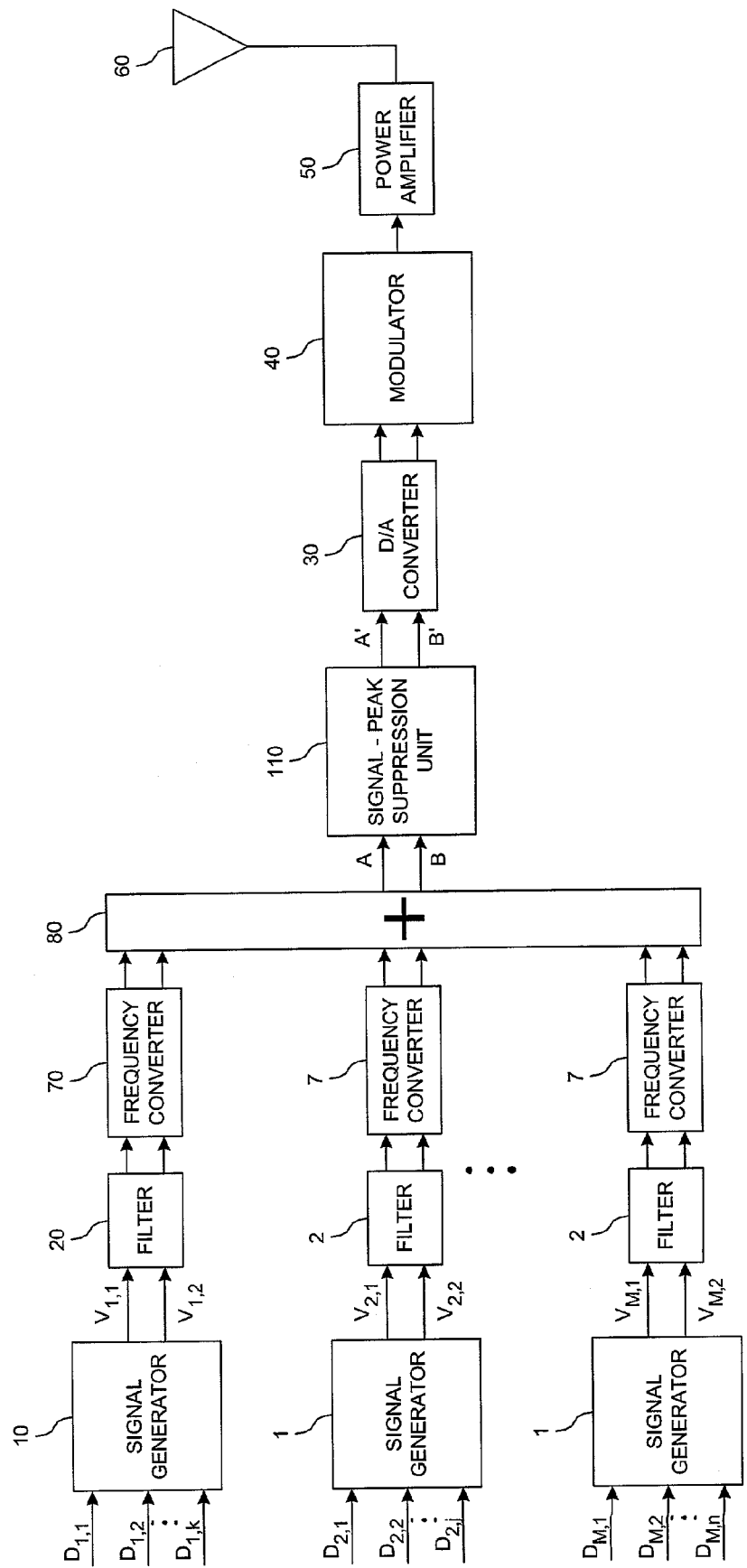
FIG. 5 is a block schematic drawing of the present invention showing signal-peak suppression just prior to D/A conversion in a multiple carrier communication system.

Referring to FIG. 5, a preferred embodiment of a multiple carrier communications system employing signal-peak suppression in accordance with the present invention is illustrated. A communication signal, which may comprise a digitally sampled signal stream represented by an in-phase component signal stream A and a quadrature-phase component signal stream B, is input to a signal-peak suppression unit 110. This digitally sampled signal stream may represent one or more transmit carriers with each of these transmit carriers providing one or more communication channels as produced by the signal generators 10, filters 20, frequency converters 70 and combiner 80. The signal-peak suppression unit outputs a peak-reduced signal stream represented by an in-phase component signal stream A' and a quadrature component signal stream B'. This peak-reduced signal is then D/A converted at D/A converter 30, modulated onto a RF carrier at RF up converting modulator 40, amplified by power amplifier 50, and transmitted with an antenna 60.

In both the embodiment of FIG. 4 and FIG. 5, the communication signal which is input to the peak suppression unit 110 is band limited to a band corresponding to the spectral band allocated to the communication system, typically by a government body such as the FCC (Federal Communication Commission). This band limiting is typically provided by filters 20. These filters may be viewed as modulation filters since in addition to limiting the signal band to the allocated spectral mask the trajectory of the signal waveform is modified in a manner that must be consistent with the modulation scheme. As will be discussed in detail below the signal peak suppression unit 110 peak suppresses the communication signal without violating the spectral band or the modulation scheme.

Figure 6:
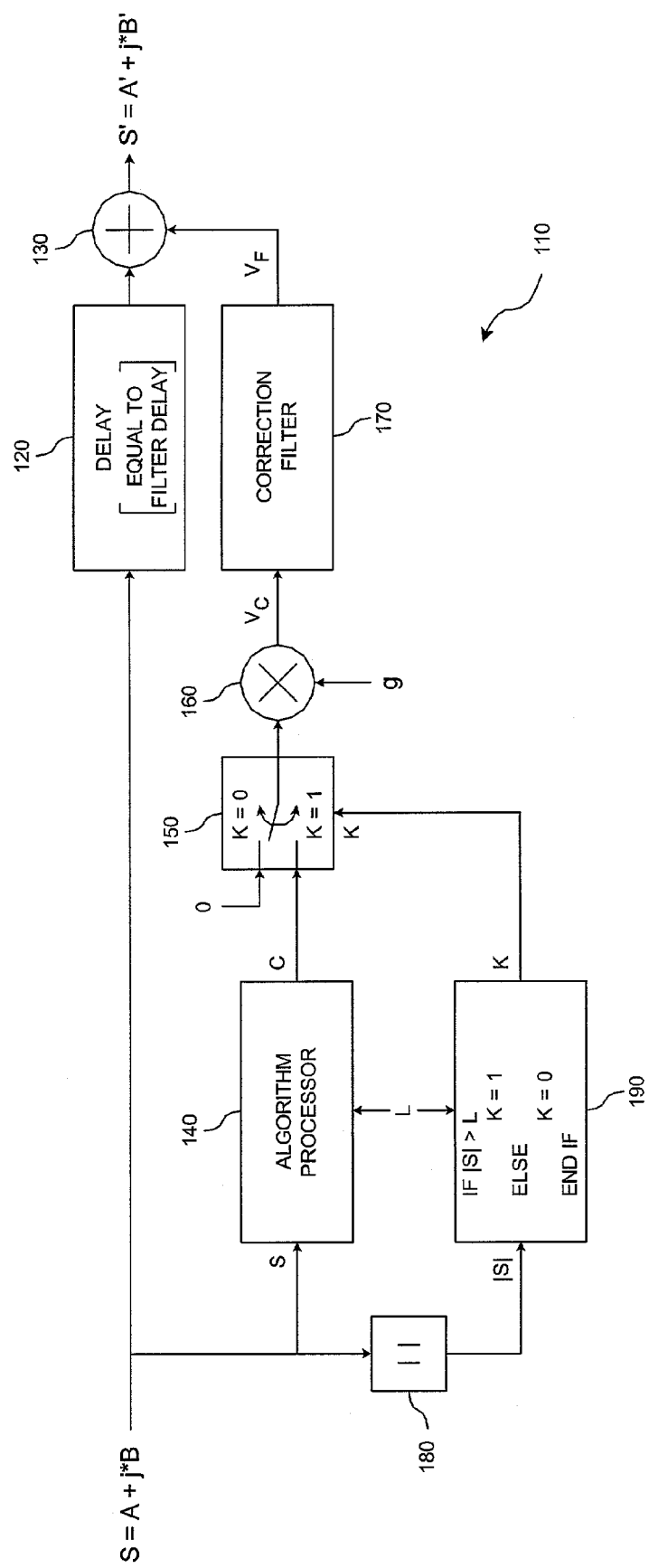
FIG. 6 is a detailed block schematic drawing of the signal-peak suppression unit shown in FIG. 4 and FIG. 5.

Referring to FIG. 6, a detailed embodiment of the signal-peak suppression unit 110 of FIG. 4 and FIG. 5 is illustrated. The signal-peak suppression unit processes the in-phase and quadrature-phase component streams A and B as a single complex signal stream S. The signal-peak suppression unit includes a first signal path with a delay 120 and a parallel correction signal path. An algorithm processor 140 in the correction signal path calculates a correction vector C based on each sample of S and a signal limiting constant L. The magnitude of each sample of S is determined at 180 and input to a switch driver 190, which controls switch 150. Switch 150 selects either the calculated correction vector C or the value zero depending on whether the magnitude of the current sample of S exceeds the limiting constant L. The output of switch 150 represents the difference between the input signal stream S and a version of S hard limited to the amplitude L. The output of the switch is then adjusted by a gain constant g at multiplier 160 to create the correction signal stream $V_C$. The correction signal stream $V_C$ is then filtered with a correction filter 170 to create the filtered correction signal stream $V_F$. The filtered correction signal stream $V_F$ is then combined at combiner 130 with a time-delayed version of the input complex signal stream S. The combined signal stream is the peak-adjusted output signal stream S' that can be represented as in-phase component A' and quadrature component B' signal streams.

It is important to notice that the output signal stream S' is created from a delayed version of the input signal stream S and the filtered correction signal stream $V_F$. The filtered correction signal $V_F$ acts as interference to the transmission of data to the intended communication channel users. The gain g adjusts the level of interference. If the gain g were set to zero the signal stream S would be transmitted without interference. Notice that the only change to the input signal stream S is the addition of $V_F$. The input signal stream S is not changed by either time varying gain control or filtering. Both filtering and time varying gain control of the signal stream S would cause signal changes. Such changes would act to affect the modulation of the input signal stream S. In the present invention the modulation of the input signal stream S is unaffected by the addition of the filtered correction signal stream $V_F$.

The correction signal stream $V_C$ comprises a waveform and thus has an associated bandwidth. The correction filter 170 is employed to limit the bandwidth of the correction waveform of the correction signal stream $V_C$. The bandwidth and frequency dependent gain of the correction filter should be set to meet the government allocated bandwidth requirements of the desired communication signal. In the single transmit carrier case, the correction filter can be set to match the filter characteristics of the filter 20 shown in FIG. 4. In the multiple carrier case, the correction filter bandwidth should be set to cover all transmitted carriers. The correction filter will time delay the correction signal stream $V_C$ requiring a matching time delay, provided by time delay circuit 120, to signal stream S prior to signal combination with $V_F$. Time delay circuit 120 should also include any additional delays associated with the correction signal path, e.g., such as due to algorithm processor 140. This signal combination produces S' in FIG. 6.

Figure 7:
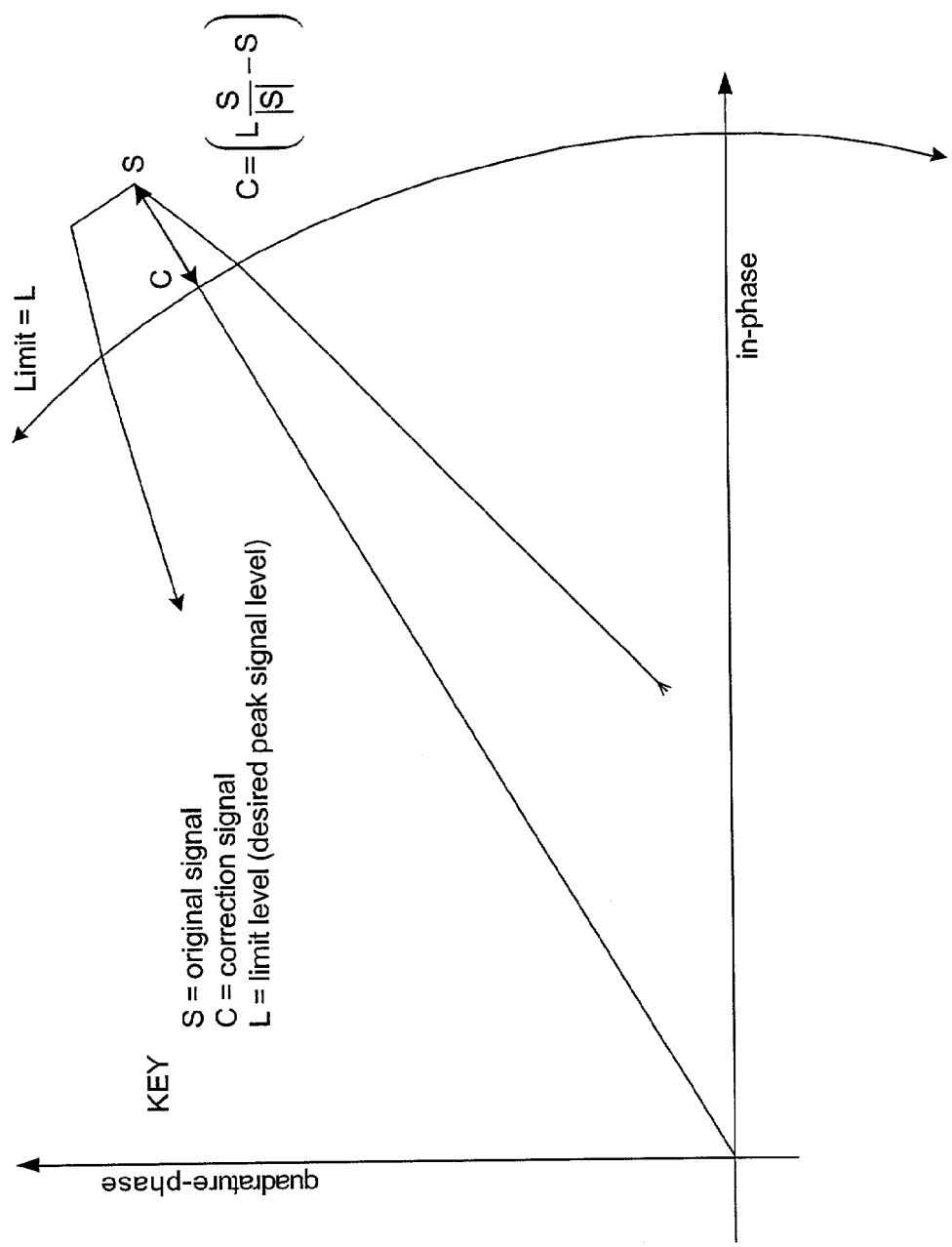
FIG. 7 shows a complex signal vector diagram detailing the calculation of the correction signal used to suppress the output signal peak power.

The algorithm processor 140 uses Equation (1) below to calculate the correction vector C for each sample of S. This equation was developed geometrically from FIG. 7. FIG. 7 shows a time trajectory segment of the complex input signal stream S and a vector representing a single sample of S. At the time instant of the sample shown, the complex input signal S exceeds the limiting constant L by the complex vector C. The complex vector C is calculated using Equation (1).

$$C = \left( L\frac{S}{|S|} - S \right) \quad (1)$$

Referring to FIG. 6, the correction vector C only contributes to correction signal stream $V_C$ when the magnitude of a complex input signal sample of S exceeds the limiting constant L. If the output from the switch 150 were added directly to the input complex signal stream S, the output peak power would be clamped to the limiting constant L. Unfortunately, the bandwidth of the switch output would exceed the government allocated bandwidth required for the output signal. To limit the switch output bandwidth, the correction signal stream $V_C$ is passed through the correction filter.

Figure 8:
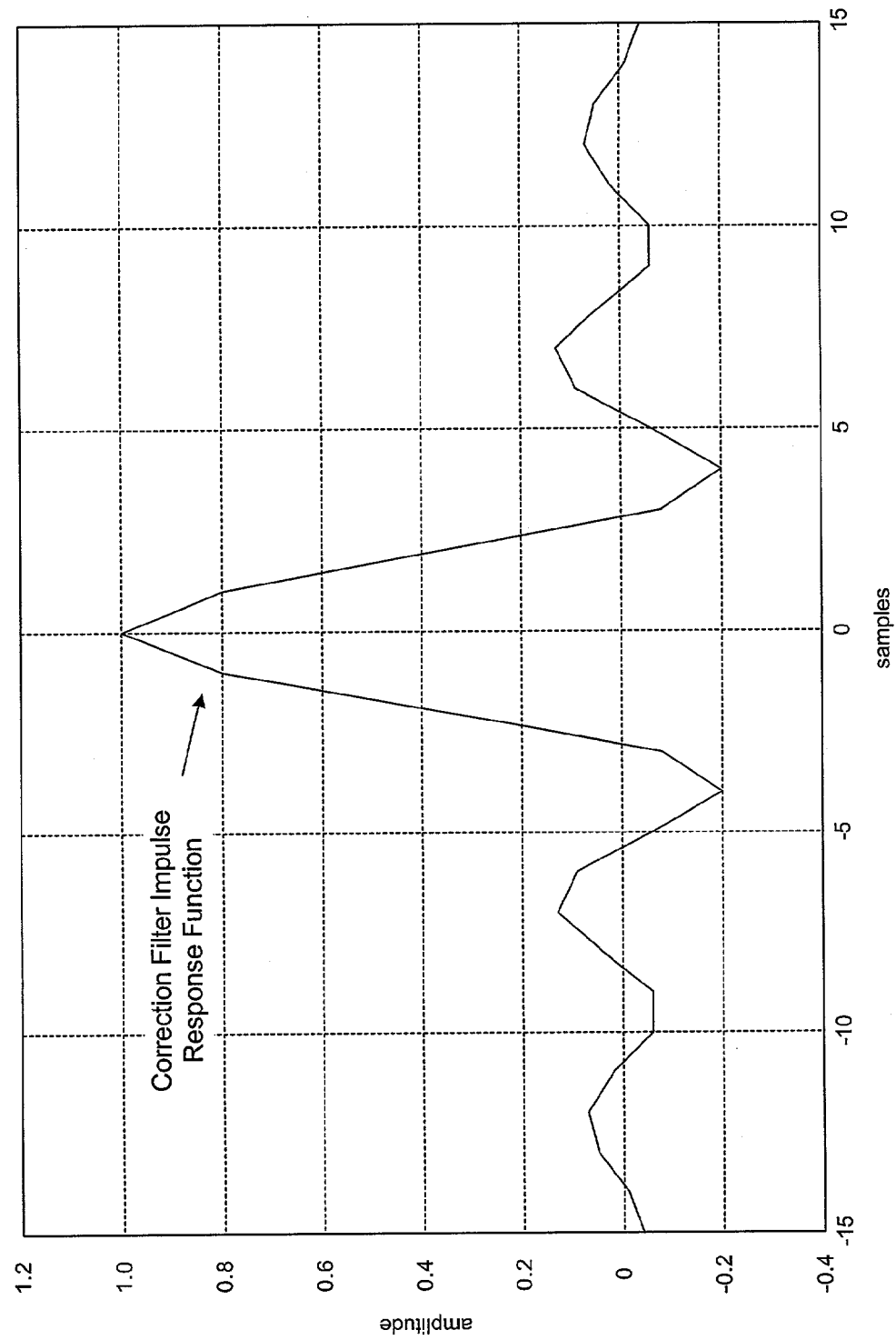
FIG. 8 shows the impulse response function of the correction filter used to limit the bandwidth of the correction signal calculated in FIG. 7.

Each input sample to the correction filter will produce an input sample gain adjusted reproduction of the correction filter impulse response function at the filter output. These reproductions are combined to produce the correction filter output. FIG. 8 shows a typical impulse response function that may be produced by a correction filter. This impulse response function is shown for example purposes only. The impulse response function used in an actual functioning system will be determined by system needs. It is instructive to examine the correction filter output based on a few simple example $V_C$ signal streams.

Figure 9:
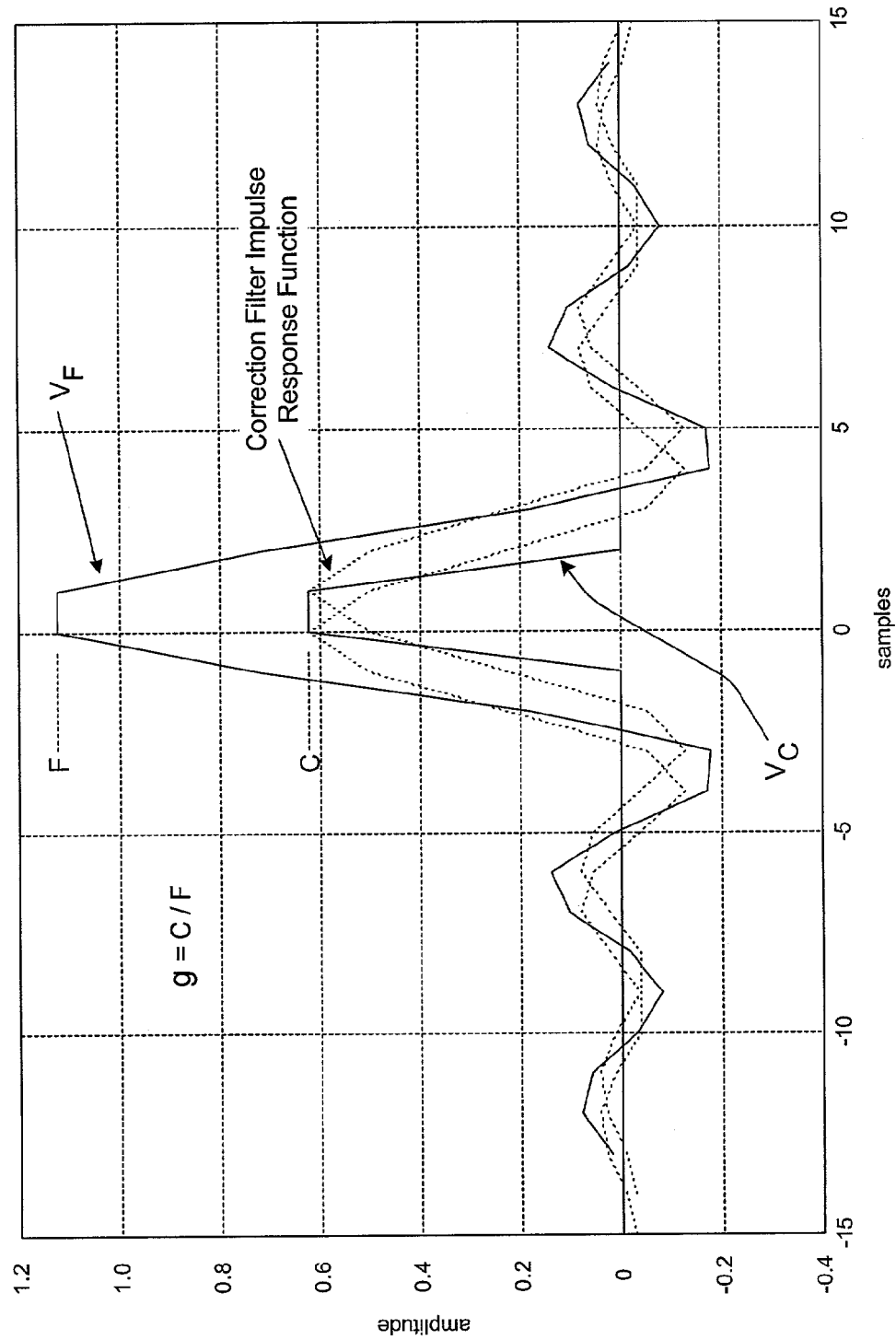
FIG. 9 shows the effect filtering has on an example correction signal and illustrates the advantages of gain weighting the correction signal.

Consider a short duration peak signal stream S that produces a correction signal $V_C$ composed of two equal amplitude correction samples in time sequence. These two correction samples would be preceded and followed by zero valued samples based on the switch 150 selection. The correction filter input and output signals $V_C$ and $V_F$ for this example are both shown in FIG. 9. The two non-zero input samples of $V_C$ are just over 0.6 in amplitude. The figure shows how the impulse response function of the correction filter acts on $V_C$ to create $V_F$. The filtered correction signal amplitude F corresponds to the input signal correction amplitude C in FIG. 9. To prevent over compensation, a gain adjustment g must be applied in the correction signal generation path prior to combining with signal S in FIG. 6. For the example shown, FIG. 9 calculates this gain g by simply taking the ratio of C over F.

The gain calculation in the last paragraph was specific to the example $V_C$ sample stream described. If the correction filter input signal stream were just one correction sample proceeded and followed by zero valued samples, the filter input and output amplitudes would have been the same at the required correction instant. In this second example, the gain g calculated would have been one.

The two examples used to evaluate the gain constant g provided different gains for different correction signal input examples. Any real correction signal $V_C$ will produce an infinite number of similar type examples. The gain constant g used must provide the best possible peak signal suppression for all possible variations in $V_C$. Typical variations in $V_c$ can be determined by performing a trial using a representative fixed time length complex input signal S, and a fixed limiting constant L. With a typical $V_C$ signal produced, a series of test trials can be performed with different gain g constants. From these trials curves of S' peak-to-average ratio versus gain g and $V_F$ signal power versus gain g can be plotted to determine the best performance producing gain g value.

Figure 10:
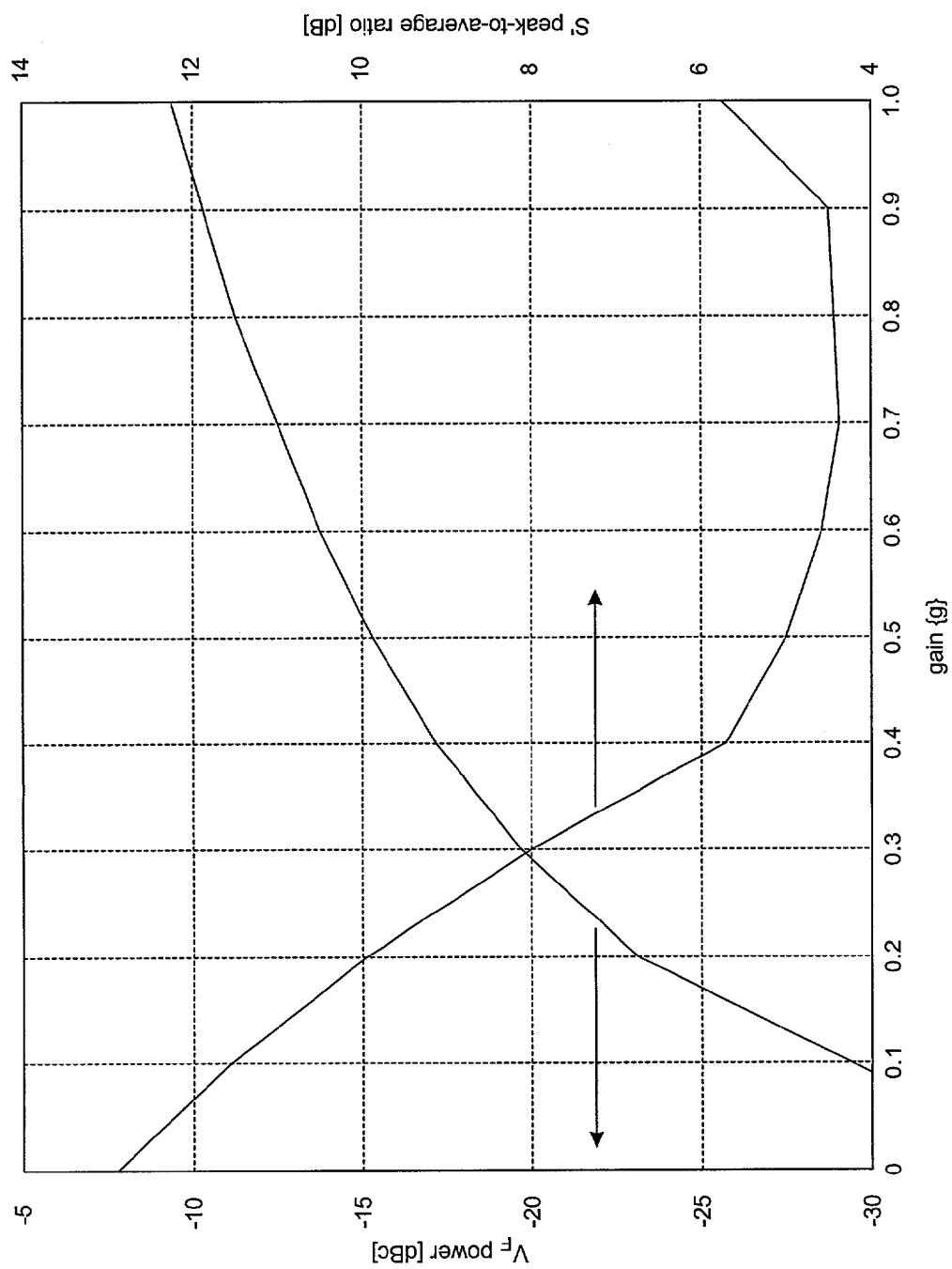
FIG. 10 shows a graphical approach to determining the gain weighting constant used.

FIG. 10 shows an example set of these curves for a specific test case. The exact particulars of the test case are not important. The curves are shown as an example on how to select the best performing gain g constant. One curve in FIG. 10 shows the power Of $V_F$ measured relative to the power in S just prior to combining with S. The other curve shows the peak-to-average ratio of the output signal S'. $V_F$ signal power represents distortion in the output complex signal S'. $V_F$ signal power should be kept to a minimum to avoid degrading overall system communication quality. FIG. 10 shows that lower gains produce lower $V_F$ signal power but also lower reduction in S' peak-to-average ratio. The S' peak-to-average ratio curve shows a knee in the peak-to-average reduction at g equal to 0.4. Increasing gain g much beyond 0.4 could increase the output signal distortion caused by $V_F$ without significant additional suppression of peak power.

The gain g selection demonstrated above was shown for demonstration purposes only. In an actual system the gain g would depend on the specific input signal S, the limiting constant L, and the correction filter design used. The gain value should be less than 1 when the peak impulse response of the correction filter is normalized to 1. In a more general case the gain value should be greater than zero but less than a level that would cause the peak to average ratio to begin increasing.

Finally, further signal-peak suppression can be achieved by cascading in series multiple signal-peak suppression units 110 shown in FIG. 4 and FIG. 5. By cascading signal-peak suppression stages less signal distortion will be present in the eventual output signal than if a larger gain value were selected in a single stage process. The method shown in FIG. 10 should be used to determine the gain g constant for each stage. Since the input to each successive stage is already peak reduced, the gain g constant should be optimized to a different value for each stage. When performing test trials on successive stages the input signal used should be the peak-reduced signal from the preceding stage where the gain g has been previously optimized. If the limiting constant L is the same for each successive stage, the output signal peak will closely approach the limiting constant L within two or three successive stages.

The present invention thus provides a communications system employing a signal-peak suppression unit that is inserted just prior to D/A conversion. By doing so, the complexity and cost of the D/A converters, RF up converting modulator, and power amplifier will be reduced. Further features and advantages of the present invention will be appreciated by those skilled in the art.

A number of different embodiments of the present invention have been described in relation to the various figures. Nonetheless, it will be appreciated by those skilled in the art that a variety of additional embodiments are possible within the teachings of the present invention. For example, a variety of specific circuits implementing specific algorithms may be provided employing the teachings of the present invention and limitations of space prevent an exhaustive list of all the possible circuit implementations or an enumeration of all possible algorithms. A variety of other possible modifications and additional embodiments are also clearly possible and fall within the scope of the present invention. Accordingly, the described specific embodiments and implementations should not be viewed as in any sense limiting in nature and are merely illustrative of the present invention.

What is claimed is:

1. A communication system, comprising:
   a communication signal source providing a band limited communication signal wherein said signal source comprises a modulation filter for limiting the bandwidth of the communication signal; and a peak reduction unit coupled to receive said band limited communication signal and provide a band limited peak reduced output signal, the peak reduction unit comprising a circuit for providing a peak reduction correction waveform corresponding to the difference between the communication signal and the communication signal hard limited to a limit value, a correction filter for filtering the peak reduction correction waveform and providing a band limited peak reduction correction signal corresponding to the band limits of the communication signal, wherein said correction filter is substantially the same as said modulation filter, and a combiner for combining said band limited communication signal and said band limited peak reduction correction signal to provide said band limited peak reduced output signal.

2. A communication system as set out in claim 1, wherein said communication system is a multi-carrier communication system.

3. A communication system as set out in claim 1, wherein said communication system is a spread spectrum communication system.

4. A communication system as set out in claim 1, wherein said peak reduction unit further comprises a delay for delaying the band limited communication signal and providing the delayed signal to said combiner.

5. A communication system as set out in claim 1, wherein said combiner is a complex addition circuit.

6. A communication system as set out in claim 1, further comprising a digital-to-analog conversion stage for converting said peak reduced output signal to an analog signal.

7. A communication system as set out in claim 6, further comprising a power amplifier receiving and amplifying said analog signal.

8. A communication system as set out in claim 7, further comprising an antenna coupled to the output of the power amplifier.

9. A peak reduction unit comprising:
a first signal path receiving a band limited input signal and including a delay circuit for delaying the input signal;
a second parallel signal path receiving said band limited input signal and including a peak reduction calculation unit for calculating a peak reduction correction and a filter providing a filtering operation on the peak reduction correction; and
a combiner combining the filtered peak reduction correction and delayed input signal and providing peak adjusted output signals,
wherein said second signal path further comprises a signal magnitude detector, a comparator for comparing the signal magnitude to a predetermined limit value and a switch coupled to the output of the comparator and the peak reduction calculation unit for selecting said peak reduction correction if the signal magnitude exceeds the predetermined limit value.

10. A peak reduction unit comprising:
a first signal path receiving a band limited input signal and including a delay circuit for delaying the input signal;
a second parallel signal path receiving said band limited input signal and including a peak reduction calculation unit for calculating a peak reduction correction and a filter providing a filtering operation on the peak reduction correction; and a combiner combining the filtered peak reduction correction and delayed input signal and providing peak adjusted output signals,
wherein said second signal path further comprises a gain circuit for adjusting the magnitude of the correction by a gain value.

11. A peak reduction unit as set out in claim 10, wherein said gain value is less than 1 when the peak impulse response of the correction filter is normalized to 1.

12. A peak reduction unit as set out in claim 10, wherein said gain value is greater than zero but less than a level that would cause the peak to average ratio to begin increasing.

13. A peak reduction unit as set out in claim 10, wherein said gain circuit comprises a multiplier receiving said peak reduction correction signal and multiplying it by said gain value.

14. A peak reduction unit comprising:
a first signal path receiving a band limited input signal and including a delay circuit for delaying the input signal;
a second parallel signal path receiving said band limited input signal and including a peak reduction calculation unit for calculating a peak reduction correction and a filter providing a filtering operation on the peak reduction correction; and
a combiner combining the filtered peak reduction correction and delayed input signal and providing peak adjusted output signals,
wherein the input signal comprises digital samples represented by complex vectors and wherein the peak reduction calculation unit comprises an algorithm processor which performs a complex vector calculation on the input samples to determine a complex correction vector which when added to the input sample results in a signal magnitude at or within a predetermined limit value.

15. A peak reduction unit as set out in claim 14, wherein the combiner comprises an addition circuit.

16. A method for signal peak reduction in a communication system, where the communication signal is processed to limit the signal bandwidth to a predetermined spectral band, comprising:
receiving as an input a band limited communication signal;
determining a peak reduction correction signal based on the amount the band limited communication signal exceeds a threshold peak power value;
filtering the peak correction signal to limit the bandwidth of the peak correction signal;
adjusting the peak correction signal by a gain value before said combining; and combining the filtered peak correction signal and input filtered communication signal to provide a peak reduced output communication signal.

17. A method for signal peak reduction in a communication system as set out in claim 16, further comprising repeating said determining, gain adjusting, filtering and combining employing a different gain value.

18. A method for signal peak reduction in a communication system as set out in claim 16, wherein said gain value is greater than zero but less than a level that would cause the peak to average ratio to begin increasing.

19. A method for signal peak reduction in a communication system where the communication signal is processed to limit the signal bandwidth to a predetermined spectral band, comprising:
receiving as an input a band limited communication signal;

determining a peak reduction correction signal based on the amount the band limited communication signal exceeds a threshold peak power value, wherein said determining comprises performing a peak reduction algorithm on said input communication signal;

filtering the peak correction signal to limit the bandwidth of the peak correction signal; and combining the filtered peak correction signal and input filtered communication signal to provide a peak reduced output communication signal.

20. A method for signal peak reduction in a communication system as set out in claim 19, further comprising detecting the magnitude of the input communication signal and comparing the magnitude to a peak limit value.

21. A method for signal peak reduction in a communication system as set out in claim 20, further comprising selectively outputting the peak reduction correction signal to be filtered and combined only when the magnitude of the input communication signal exceeds the magnitude of the peak limit value.

22. A method for signal peak reduction in a communication system as set out in claim 19, wherein said communication signal is a multi-carrier signal provided by combining a plurality of separate carrier signal sources, each having a stream of carrier symbols corresponding to one or more data channels.

23. A method for signal peak reduction in a communication system as set out in claim 19, wherein said communication signal is a spread spectrum signal provided by combining a plurality of separate streams of communication symbols corresponding to a plurality of data channels.

* * * * *